United States Patent [19]

Kinoshita

[11] Patent Number: 5,738,926

[45] Date of Patent: Apr. 14, 1998

[54] METALLIZED POLYESTER FILM CAPACITOR

[75] Inventor: Shinichi Kinoshita, Machida, Japan

[73] Assignee: Diafoil Hoechst Company Limited, Tokyo, Japan

[21] Appl. No.: 978,959

[22] Filed: Nov. 23, 1992

[30] Foreign Application Priority Data

Nov. 29, 1991 [JP] Japan ................... 3-316936
Mar. 24, 1992 [JP] Japan ................... 4-066308

[51] Int. Cl.$^6$ ............ B32B 15/08; B32B 27/08; B32B 27/36; B32B 27/40
[52] U.S. Cl. ............ 428/141; 428/216; 428/423.7; 428/425.8; 428/458; 428/480; 428/694 TS
[58] Field of Search ............ 428/457, 480, 428/910, 461, 483, 423.1, 423.7, 425.8, 458, 462, 694 TS, 694 TP, 694 TR, 215, 216, 141

[56] References Cited

U.S. PATENT DOCUMENTS

| | | | |
|---|---|---|---|
| 3,740,254 | 6/1973 | Lansbury et al. | 117/71 |
| 3,783,480 | 1/1974 | Booe | 29/25.42 |
| 4,704,325 | 11/1987 | Crocker | 428/323 |
| 4,755,337 | 7/1988 | Takahashi et al. | 264/134 |
| 4,795,672 | 1/1989 | Takeda et al. | 428/216 |
| 4,971,863 | 11/1990 | Hart | 428/458 |
| 4,978,708 | 12/1990 | Fowler et al. | 524/507 |
| 5,019,418 | 5/1991 | Linzey et al. | 427/79 |
| 5,106,681 | 4/1992 | Endo et al. | 428/323 |
| 5,188,891 | 2/1993 | Takeda et al. | 428/323 |

FOREIGN PATENT DOCUMENTS

| | | |
|---|---|---|
| 0187458 | 7/1986 | European Pat. Off. . |
| 0348062 | 12/1989 | European Pat. Off. . |
| 0 484 956 | 5/1992 | European Pat. Off. . |
| 2086447 | 12/1971 | France . |
| 60-115214 | 6/1985 | Japan . |
| 60-120511 | 6/1985 | Japan . |

OTHER PUBLICATIONS

Database WPI, Week 8930 Derwent Publications Ltd., London, GB. AN89–216508 & JP-A-1 153 735 Jun. 15, 1989.
Database WPI, Week 8521, Derwent Publications Ltd. London, GB. AN 85–125275 & JP-A-60 063 151 Apr. 11, 1985.
Database WPI, Week 9013, Derwent Publications Ltd., London, GB; AN 90–096957 & JP-A-2050837; Feb. 1990.

*Primary Examiner*—Paul J. Thibodeau
*Assistant Examiner*—Vivian Chen
*Attorney, Agent, or Firm*—Foley & Lardner

[57] ABSTRACT

A metallized polyester film capacitor is composed of a metallized polyester film comprising: a polyester film; a coating layer composed of a water-soluble or a water-dispersible polyester resin or polyurethane resin wherein the coating layer is formed on at least one side of the polyester film and wherein the alkali metal content of said coating layer is no more than 126.5 ppm; and a vapor-deposited metal on the coating layer.

35 Claims, No Drawings

METALLIZED POLYESTER FILM CAPACITOR

BACKGROUND OF THE INVENTION

The present invention relates to a metallized polyester film capacitor. More particularly, the present invention relates to a metallized polyester film capacitor which has an excellent moist heat resistance and an improved adhesiveness between a vapor-deposited metal and a substrate film.

Polyester films such as polyethylene terephthalate films have excellent mechanical properties, heat resistance and electric properties, so that they are frequently used as a substrate film for capacitors. With the recent development of various electronic machines, however, polyester films have been required to have higher properties. One of the properties required is a long-term stability of a high moist heat resistance. A metallized polyester film is disadvantageous in that the adhesiveness of the substrate film to the vapor-deposited metal is poor, especially, in an environment of a high temperature and a high humidity. When a capacitor of such a metallized polyester film is exposed to a high temperature and a high humidity, the moisture is penetrated at the interface between the substrate film and the vapor-deposited metal, so that the capacitance of the capacitor is lowered with passage of time. Thus, a metallized polyester film is required to have improved moist heat resistance so as to produce a capacitor having long-term durability.

Japanese Patent Application Laid-Open (KOKAI) No. 60-115214(1985) discloses a film capacitor having a vinylidene chloride coating layer, and Japanese Patent Application (KOKAI) No. 60-120511(1985) discloses a film capacitor having a coating layer of a mixture containing melamine and/or a urea resin as the essential ingredient. These capacitors have an excellent moist heat resistance.

Further, European Patent 0 484 956 A teaches a metallized polyester film capacitor element produced by winding or stacking a metallized polyester film or a plurality of the metallized film, the metallized polyester film being produced by the following steps: coating solution containing a resin comprising a polyurethane or a polyester and an epoxy compound at least on one surface of a polyester film to obtain a film having a coating layer at least on one surface of the film, the center line average roughness (Ra) of the coating layer being in the range from 0.005 to 0.5 mm; and vapor-depositing a metal on the surface of the coating layer to obtain the metallized polyester film.

However, it cannot be said that the performances of the capacitor are not always sufficiently maintained even by using as the coating composition, the resin compositions described in the above references. With the recent development of various electronic machines, the demand for the more long-term reliability of capacitors, especially, the more long-term stability of the moisture and heat resistance of capacitors has been increasing.

As a result of various studies undertaken by the present inventor so as to solve these problems, it has been found that by reducing the alkali metal content in a coating layer sandwiched between a polyester film as a substrate film and a vapor-deposited metal to not more than 1,000 ppm, the obtained metallized polyester film capacitor has an excellent moist heat resistance. The present invention has been achieved on the basis of this finding.

SUMMARY OF THE INVENTION

In a first aspect of the present invention, there is provided a metallized polyester film capacitor comprising: a metallized polyester film composed of a polyester film, a coating layer formed at least on one side of the polyester film, an alkali metal content of the coating layer being not more than 1000 ppm, and a metal vapor-deposited on the coating layer.

In a second aspect of the present invention, there is provided a metallized polyester film capacitor comprising: a metallized polyester film composed of a polyester film, a coating layer formed at least on one side of the polyester film, which is composed of (a) at least one of resins having a carboxyl group, a hydroxyl group or salts thereof and (b) at least one crosslinking agent selected from the group consisting of an isocyanate compound, an epoxy compound and an amine compound, an alkali metal content of the coating layer being not more than 1000 ppm, and a center line average roughness (Ra) of the surface of the coating layer being 0.005 to 0.5 mm; and a metal vapor-deposited on the coating layer.

In a third aspect of the present invention, there is provided a metallized polyester film capacitor comprising: a metallized polyester film composed of a polyester film, a coating layers formed on both sides of the polyester film, an alkali metal content of the coating layer being not more than 1000 ppm, and a metal vapor-deposited on each of the coating layers; and a polyester film or a polyester film in which the coating layer is formed at least on one side of the polyester film and an alkali metal content of the coating layer is not more than 1000 ppm.

In a fourth aspect of the present invention, there is provided a metallized polyester film capacitor comprising: a metallized polyester film composed of a polyester film, coating layers formed on both side of the polyester film and composed of (a) at least one of resins having a carboxyl group, a hydroxyl group or salts thereof and (b) at least one crosslinking agent selected from the group consisting of an isocyanate compound, an epoxy compound and an amine compound, an alkali metal content of the coating layer being not more than 1000 ppm and a center line average roughness (Ra) of the surface of the coating layer being 0.005 to 0.5 mm, and a metal vapor-deposited on each of the coating layers; and a polyester film or a polyester film in which the coating layer is formed at least on one side of the polyester film and an alkali metal content of the coating layer is not more than 1000 ppm.

DETAILED DESCRIPTION OF THE INVENTION

The polyester in the polyester film in the present invention is polyethylene terephthalate in which not less than 80 mol % of the structural units is ethylene terephthalate, polyethylene naphthalate in which not less than 80 mol % of the structural units is ethylene naphthalate, or poly-1,4-cyclohexanedimethylene terephthalate in which not less than 80 mol % of the structural units is 1,4-cyclohexanedimethylene terephthalate.

The copolymer components other than the above-described main structural units are, for example, diols such as diethylene glycol, propylene glycol, neopentyl glycol, polyethylene glycol and polytetramethylene glycol, dicarboxylic acids such as isophthalic acid, 2,6-naphthalenedicarboxylic acid, 5-sodium sulfo isophthalic acid, adipic acid, azelaic acid, sebacic acid and ester-forming derivatives thereof, and oxymonocarboxylic acids such as oxybenzoic acid and ester-forming derivatives thereof.

The polyester film in the present invention may contain additive particles, deposited particles and the catalyst residues which form the protuberances on the surface of the film in the amount which does not deteriorate the later-described properties of the capacitor. The polyester film may also contain antistatic agent, stabilizer, lubricant, crosslinking agent, anti-blocking agent, antioxidant, coloring agent, light shielding agent, UV absorber, etc. as the additives other than the above-described protuberance-forming agents in the range which does not deteriorate the properties of the capacitor.

(I) The coating layer in the present invention is composed of an organic solvent-soluble, a water-soluble or a water-dispersible resin.

The coating layer in the present invention is obtained by applying a coating solution containing at least organic solvent-soluble, one water-soluble or water-dispersible resin selected from the group consisting of polyesters, vinyl chloride/vinyl acetate copolymers, ether resins, butadiene resins, acrylic resins, urethane resins and cellulose resins, or at least one of resins using the said resins as a skeleton resin to at least one surface of the polyester film, and drying the coating solution. Among these resins, urethane resins, polyesters and resins using urethane resins or polyesters as a skeleton resin are preferable. As the skeleton resin, there can cited polyesters, vinyl chloride/vinyl acetate copolymers, ether resins, butadiene resins, acrylic resins, urethane resins and cellulose resins.

The urethane resins are composed of, for example, the following polyols, polyisocyanates, chain-lengthening materials and crosslinking agents.

As the polyols, polyethers such as polyoxyethylene glycol, polyoxypropylene glycol and polyoxytetramethylene glycol, polyesters such as polyethylene adipate, polyethylene-butylene adipate and polycaprolactone, acrylic polyols and castor oil may be exemplified.

As the polyisocyanates, tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate may be exemplified.

Examples of chain-lengthening materials or crosslinking agents are ethylene glycol, propylene glycol, diethylene glycol, trimethylolpropane, hydrazine, ethylenediamine, diethylenetriamine, 4,4'-diaminophenylmethane, 4,4'-diaminodicyclohexylmethane and water.

As the components forming the polyesters, the following polycarboxylic acid and polyhydroxy compound may be exemplified.

As the polycarboxylic acid, telephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfo terephthalic acid, 5-sodium sulfo isophthalic acid, adipic acid, azelaic acid, sebacic acid, dodecanedicarboxylic acid, trimellitic acid, trimesic acid, trimellitic anhydride, phthalic anhydride, p-hydroxybenzoic acid, trimellitic acid monopotassium salt and the ester-forming derivatives thereof may be exemplified.

As the polyhydroxy compound, ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylyene glycol, bisphenol A-ethylene glycol additives, diethylene glycol, triethylene glycol, polyethylene glycol, polypropylene glycol, polytetramethylene glycol, polytetramethyleneoxide glycol, dimethylolpropionic acid, glycerin, trimethylolpropane, sodium dimethylolethyl sulfonate and potassium dimethylolpropionate may be exemplified.

At least one compound is selected from each of the groups, and the selected compounds are synthesized by ordinary polycondensation to produce the polyesters.

The polyesters in the present invention also includes composite high-molecular compounds having a polyester component such as an acrylic-grafting polyester and polyester polyurethane obtained by chain-lengthening a polyester polyol which are described in Japanese Patent Application Laid-Open (KOKAI) No. 1-165633(1989).

It is preferred in the coating solution used in the present invention that water is used as a medium from the viewpoint of safety and hygiene. The coating solution may also contain an organic solvent as an assistant of such resins within the scope of the present invention. When water is used as a medium, the coating solution may be obtained by forcibly dispersing such resin by a surfactant or the like, but it is preferably a self-dispersion-type resin having a hydrophilic nonionic component such as polyethers or a cationic group such as a quaternary ammonium salts, more preferably a water-soluble or water-dispersible resin having an anionic group.

The water-soluble or water-dispersible resin having an anionic group of the present invention is polyesters, vinyl chloride/vinyl acetate copolymers, urethane resins, cellulose resins, or ones obtained by copolymerizing or grafting the said skeleton resin with compounds having an anionic group. As the anionic group, sulfonic acid, carboxylic acid, phosphoric acid and a salt thereof are preferable. In order to impart water solubility to the resin, as the counter ions to the anionic group are preferably used alkali metal ions (lithium ion, sodium ion, potassium ion or ammonium ion). But, the viewpoint of the moist heat resistance of the capacitor, in order to adjust the alkali metal content of the coating layer the counter ions are selected from amine onium ions including ammonium ion. The amount of anion group in the water-soluble or water-dispersible resin having the anion group is preferably 0.05 to 8 wt %. If the anion group content is less than 0.05 wt %, the water solubility or water dispersibility of the resin is sometimes lowered. On the other hand, if the anion group content exceeds 8 wt %, the water resistance of the coating layer is sometimes lowered and the coating layer moistens so that the films stick each other or the moist heat resistance of the capacitor is sometimes lowered.

The polyesters of the water-soluble or water-dispersible resins used in the present invention is preferably polyesters having Tg of not more than 80° C., preferably 0° to 70° C.; more preferably polyesters having sulfonate (—SO$_3$M) group; still more preferably polyesters wherein an acidic moiety contains 1 to 10 mol % of sulfo aromatic dicarboxylic acid unit or salts thereof unit; most preferably polyesters wherein an acidic moiety contains 1 to 10 mol % of sulfo isophthalic acid unit or salts thereof.

The urethane resins of the water-soluble or water-dispersible resins used in the present invention is preferably urethane resins having carboxylic acid group (—COOH) or salts thereof as a hydrophilic group; more preferably urethane resins wherein a polyol moiety contains not less than 50 mol %, preferably not less than 70 mol % of polyester polyol unit; still more preferably urethane resins wherein a isocyanate moiety contains not less than 50 mol %, preferably not less than 70 mol % of aromatic diisocyanate unit and/or isophorone diisocyanate unit.

An amount of the organic solvent-soluble resins, the water-soluble resins or the water-dispersible resins is not less than 60 wt %, preferably not less than 70 wt %, more preferably not less than 90 wt %.

In order to improve the sticking property (blocking property), water resistance, solvent resistance and mechanical strength of the coating layer, the coating solution used in the present invention may contain a crosslinking agent such as isocyanate compounds, epoxy compounds, amine compounds, aziridine compounds, silane coupling agents, titanium coupling agents, zirco-aluminate coupling agents, peroxides, heat and light-reactive vinyl compounds and photosensitive resins. The content of this crosslinking agent is not more than 40 wt %.

The coating solution may also contain a lubricant, for example, inorganic fine particles such as silica, silica sol, alumina, alumina sol, zirconium sol, kaolin, talc, calcium carbonate, calcium phosphate, titanium oxide, barium sulfate, carbon black, molybdenum sulfide and antimony oxide sol and organic fine particles such as polystyrene, polyethylene, polyamide, polyester, polyacrylate, epoxy resin, silicone resin and fluorine resin within the range which maintains the later-described surface roughness. The lubricant content is not more than 40 wt %, preferably not more than 20 wt %. The coating solution may further contain, if necessary, antifoaming agent, coaterbility improving agent, thickening agent, antistatic agent, organic lubricant, antioxidant, UV absorber, foaming agent, dye, pigment, etc.

The alkali metal content greatly influences the properties of the capacitor. An excess of an alkali metal greatly lowers the capacitance of the capacitor when it is exposed to a high temperature and a high humidity applying a DC voltage thereto. The alkali coating solution is therefore not more than 1000 ppm, preferably not more than 500 ppm, more preferably not more than 200 ppm.

It is inevitable that an alkali metal is contained in the coating solution as impurities in the process of synthesis of a raw material to the preparation of the coating solution in the actual industrial production. Commercially available service water or ground water is often used in the preparation of the raw materials thereof. Furthermore, in order to make the resin water-soluble, an alkali ion is generally used as the counter ions of a hydrophilic functional group of an anionic resin which is preferably used in the present invention. In these cases, the coating solution of the present invention is obtained by deionization as occasion demands.

As a method of deionization, an ion exchange described in Ion Exchangers in Analytical Chemistry, by Olof Samuelson, published by John Wiley & Sons, Inc., New York, pages 46-50, may be used.

(II) The coating layer of the present invention is composed of (a) at least one resin selected from the group of resins having a carboxyl group, a hydroxyl group or salts thereof, (b) at least one crosslinking agent selected from the group consisting of isocyanate compounds, epoxy compounds and amine compounds, and, if necessary, a lubricant.

The resin having a carboxyl group, a hydroxyl group or salts thereof in the present invention is a resin crosslinked by the later-described crosslinking agent and having a high adhesiveness to the vapor-deposited metal layer. Resins in which all the carboxyl groups and/or the hydroxyl groups may be the salts thereof, or parts of the carboxyl groups and/or the hydroxyl groups at the ends or side chains may be salts, can be used. The resin having a carboxyl group, a hydroxyl group or salts thereof in the present invention is polyesters, vinyl chloride/vinyl acetate copolymers, urethane resins, cellulose resins, or ones obtained by copolymerizing or grafting a skeleton resin with compounds having a carboxyl group, a hydroxyl group or salts thereof.

As the skeleton resin in which the above-described groups are possessed, polyesters, vinyl chloride/vinyl acetate copolymers, ether resins, butadiene resins, acrylic resins, urethane resins and cellulose resins may be exemplified. Among these skeleton resins, urethane resins and polyesters are preferable.

The counter ions to the carboxylic group and the hydroxyl group in the resin are mono-valent ions, preferably amine onium ions containing hydrogen ions and ammonium ions.

As a medium for the resin having a carboxyl group, a hydroxyl group or salts thereof in the present invention, an organic solvent may be used, but water is preferably used as a medium from the viewpoint of safety and hygiene.

When water is used as a medium, the coating solution may be obtained by forcibly dispersing such resin by a surfactant or the like, but as the skeleton resin, a self-dispersion-type resin having a hydrophilic nonionic component such as a polyethers or a cationic group such as a quaternary ammonium salt, more preferably a water-soluble or water-dispersible resin having an anionic group, is preferred.

The water-soluble or water-dispersible resin having an anionic group is obtained by copolymerizing or grafting the said skeleton resin with compounds having an anionic group. As the anionic group, sulfonic acid, carboxylic acid, phosphoric acid and a salt thereof are preferable. In order to impart water solubility to the resin, as the counter ions to the anionic group are used alkali metal ions. But, the viewpoint of the moist heat resistance of the capacitor, in order to adjust the alkali metal content of the coating layer the counter ions are preferably selected from amine onium ions including ammonium ion.

The amount of anion group in the water-soluble or water-dispersible resin having the anion group is preferably 0.05 to 8 wt %.

The polyesters of the water-soluble or water-dispersible resins used in the present invention is preferably polyesters having Tg of not more than 80° C., preferably 0° to 70° C.; more preferably polyesters having sulfonate (—$SO_3M$) group; still more preferably polyesters wherein an acidic moiety contains 1 to 10 mol % of sulfo aromatic dicarboxylic acid unit or salts thereof unit; most preferably polyesters wherein an acidic moiety contains 1 to 10 mol % of sulfo isophthalic acid unit or salts thereof.

The urethane resins of the water-soluble or water-dispersible resins used in the present invention is preferably urethane resins having carboxylic acid group (—COOH) or salts thereof as a hydrophilic group; more preferably urethane resins wherein a polyol moiety contains not less than 50 mol %, preferably not less than 70 mol % of polyester polyol unit; still more preferably urethane resins wherein a isocyanate moiety contains not less than 50 mol %, preferably not less than 70 mol % of aromatic diisocyanate unit and/or isophorone diisocyanate unit.

An amount of the resins having a carboxyl group, a hydroxyl group or salts thereof is 60 to 99 wt %, preferably 70 to 98 wt %.

The coating layer contains at least one crosslinking agent selected from the group consisting of isocyanate compounds, epoxy compounds and amine compounds in addition to the resin having a carboxyl group, hydroxyl group or salts thereof.

The isocyanate compounds are used in order to enhance the adhesiveness to the vapor-deposited metal film by being crosslinked with the resin having a carboxyl group, hydroxyl group or salts thereof. It is preferably isocyanate compounds having at least two isocyanate groups. It may be either a low-molecular-weight compound or a high-molecular-weight compound. Examples of such an isocyanate compound are 2,4-toluene diisocyanate, 2,6-toluene diisocyanate, xylylene diisocyanate, xylylene diisocyanate hydride, diphenylmethane-4,4-diisocyanate, diphenylmethane-4,4'-diisocyanate hydride, paraphenylene diisocyanate, 1-chloro-2,4-phenyl diisocyanate, 1-chloro-1, 4-phenyl diisocyanate, 1,5-naphthalen diisocyanate, 4,4'-biphenylene diisocyanate, hexamethylene diisocyanate, 1,4-tetramethylene diisocyanate, isophorone diisocyanate, trimer of isophorone diisocyanate, triphenylmethane triisocyanate, methylenebis(4-phenylmethane)triisocyanate, trimethylolpropane of these isocyanate compounds, triethylene glycol additives of these isocyanate compounds, ketoxime block materials of these isocyanate compounds, and phenol block materials of these isocyanate compounds. The isocyanate compound, however, is not restricted thereto.

The epoxy compounds are used in order to enhance the adhesiveness with the vapor-deposited metal film by being crosslinked with the resin having a carboxyl group, hydroxyl group or salts thereof. It is preferably epoxy compounds having at least two epoxy groups. Examples of such an epoxy compound are diglycidyl ether of bisphenol A and origomers thereof, diglycidyl ether of bisphenol A hydrate and origomers thereof, diglycidyl orthophthalate, diglycidyl isophthalate, diglycidyl terephthalate, diglycidyl p-oxybenzoate ether, diglycidyl tetrahydrophthalate, diglycidyl hexahydrophthalate, diglycidyl succinate, diglycidyl sebacate, diglycidyl adipate, ethylene glycol diglycidyl ether, propylene glycol diglycidyil ether, 1,4-butandiol diglycidyl ether, 1,6-hexanediol diglycidyl ether, polyalkylene glycol diglycidyl ether, triglycidyl trimellitate, triglycidyl isocyanurate, 1,4-diglycidyloxy-benzene, diglycidilethyleneurea, diglycidilpropyleneurea, glycerin diglycidyl ether, glycerin triglycidyl ether, glycerin polyglycidyl ether, trimethylolethane polyglycidyl ether, trimethylolpropane triglycidyl ether, trimethylolpropane polyglycidyl ether, pentaerythritolpolyglycidyl ether, and polyglycidyl ether, diglycidyl aniline and diglycidyl amine of glycerol alkyleneoxide additives. The epoxy compound, however, is not restricted thereto.

The amine compound is used in order to enhance the adhesiveness with a vapor-deposited metal film by being crosslinked with the resin having a carboxyl group, hydroxyl group or salts thereof. As examples of the amine compound, amino compounds such as melamine, urea and benzoguanamine, amino resins obtained by the addition condensation of these amino compounds with formaldehyde or an alcohol having 1 to 6 carbon atoms, hexamethylenediamine, and triethanolamine may be cited. The amine compound, however, is not restricted thereto.

The content of the crosslinking agent selected from the isocyanate compounds, the epoxy compounds and the amine compounds in the coating layer of the present invention is in the range of 1 to 40 wt %, preferably in the range of 2 to 30 wt %, more preferably in the range of 3 to 20 wt %. If the content of the crosslinking agent is too small, the improvement of the adhesiveness, especially, the water-resisting adhesiveness can sometimes not be expected. When the content of the crosslinking agent is too large, the adhesiveness, especially, the water-resisting a adhesiveness is apt to be lowered probably because of the crosslinking agent which remains unreacted.

In order to improve the sticking property (blocking property), water resistance, solvent resistance and mechanical strength of the coating layer, the coating solution may contain other crosslinking agent such as aziridine compounds, silane coupling agents, titanium coupling agents, zirco-aluminate coupling agents, peroxides, heat and light-reactive vinyl compounds and photosensitive resins than the above-described crosslinking agent of the present invention. The content of this crosslinking agent other than the essential crosslinking agent of the present invention is not more than 40 wt %.

In order to improve the sticking property (blocking property) and slipperiness, the coating solution may also contain a lubricant such as silica, silica sol, alumina, alumina sol, zirconium sol, kaolin, talc, calcium carbonate, calcium phosphate, titanium oxide, barium sulfate, carbon black, molybdenum sulfide and antimony oxide sol as inorganic fine particles and polystyrene, polyethylene, polyamide, polyester, polyacrylate, epoxy resin, silicone resin and fluorine resin as organic fine particles within the range which maintains the later-described surface roughness. The lubricant content is not more than 40 wt %, preferably not more than 20 wt %.

The coating solution may further contain, if necessary, antifoaming agent, coaterbility improving agent, thickening agent, antistatic agent, organic lubricant, antioxidant, UV absorber, foaming agent, dye, pigment, etc.

In order to improve the properties of the coating solution or the coating layer, the coating solution may also contain another polyesters, polyurethanes, acrylic resins or vinyl resins as a polymer in addition to the above-described essential resin of the present invention.

As methods of applying the above-described coating solution to the polyester film, there are a method of applying the coating solution by using a reverse roll coater, gravure coater, rod coater, air doctor coater or another coating equipments described in "Coating method" by Yuzi Harasaki, published by Maki Shoten, 1979, before, between or after the stretching steps, and a method of applying the coating solution by using the above-described coating equipments in the process of producing the biaxially stretched polyester film, is preferred. As a method of applying the coating solution in the process of producing the biaxially stretched polyester film, a method of applying the coating solution to an un-stretched polyester film and successively or simultaneously biaxially stretching the film; a method of applying the coating solution to a uniaxially stretched polyester film and stretching the resultant film in the direction perpendicular to the uniaxial direction; and a method of applying the coating solution to a biaxially stretched film and further stretching the resultant film in the transverse and/or machine direction can be cited.

The stretching process is preferably carried out at a temperature of 60° to 130° C., and the stretching ratio is ordinarily at least 4 times, preferably 6 to 20 times as expressed by the area ratio. The stretched film is ordinarily heat-treated at a temperature of 150° to 250° C. It is also preferable to relax the stretched film by 0.2 to 20% in the machine and transverse directions in the maximum temperature zone of heat treatment and/or the cooling zone at the exit of heat treatment. A more preferable method is a method of applying the coating solution to a uniaxially stretched polyester film stretched to 2 to 6 times at a temperature of 60° to 130° C. by roll stretching, stretching the resultant uniaxially stretched polyester film in the direction perpendicular to the previous stretching direction to 2 to 6 times at a temperature of 80° to 130° C. after appropriate drying or without such drying, and heat-treating the resultant biaxially stretched film at a temperature 150° to 260° C. for 1 to 600 seconds.

According to this method, it is possible to dry the coating layer simultaneously with the stretching of the substrate film and make the thickness of the coating layer small in accordance with the stretching ratio of the film, so that it is possible to produce a film suitable as base material of a polyester film at a comparatively low cost.

The coating solution in the present invention may be applied to either one side or both sides of the polyester film. In the case of applying the coating solution to one side of the polyester film, a coating layer other than the coating layer of the present invention may be formed on the other side of the film so as to impart other properties to the polyester film.

The polyester film may be subjected to chemical treatment or discharging treatment before the coating solution is applied thereto in order to improve the coating property and the adhesiveness of the coating layer to the base film.

The thickness of the coating layer is preferably 0.01 to 3 μm, more preferably 0.02 to 1 μm. Although the thickness of the coating layer is preferably small in consideration of the demand for miniaturized capacitors, if the thickness is less than 0.01 μm, since it is difficult to apply the coating solution uniformly, the product is apt to form an uneven coating layer.

The contact angle (hereinunder referred to as "waterdrop contact angle") between a waterdrop and the coating layer formed in the above-described manner is preferably not less than 60°. If the waterdrop contact angle is less than 60°, the water-resisting adhesiveness to the vapor-deposited metal film is lowered so much that it is difficult to impart moist heat resistance to the capacitor of the present invention. An attention must therefore be paid to the amount of hydrophilic group, the amount of emulsifier and the amount of hydrophilic compound.

The center line average roughness (Ra) of the surface of the coating layer formed in this way is preferably in the range of 0.005 to 0.5 μm, more preferably in the range of 0.02 to 0.3 μm, still more preferably in the range of 0.05 to 0.1 μm. If the Ra is too small, the slipperiness of the film is sometimes insufficient for good operability. On the other hand, if the Ra is too large, the surface is so rough that the withstand voltage is apt to be lowered. In addition, such a rough surface of the film is unfavorable for the demand for miniaturized capacitors having a larger capacity.

In the present invention, metals such as aluminum, palladium, zinc, nickel, gold, silver, copper, indium, tin, chromium and titanium are usable as the vapor-deposited metal on the coating layer. These metals also include the oxides thereof. Among these, aluminum is the most preferable. The thickness of the vapor-deposited metal film is preferably in the range of 10 to 5000 Å. Deposition method is generally carried out by vapor-vacuum deposition, and it may be carried out by the method such as electroplating, sputtering, etc.

The vapor-deposited metal film may be formed on both sides of the polyester film. It is also possible to subject the vapor-deposited metal film to surface treatment or to coat the vapor-deposited metal film with another resin.

Two sheets of the thus-obtained metallized polyester films (the two sheets are composed of the polyester film with metal vapor-deposited on both sides thereof and another film including the polyester film as the substrate film in accordance with the present invention) are winded together, or a multiplicity of sheets thereof are stacked, thereby producing a capacitor element. The capacitor of the present invention is produced from the thus-obtained capacitor element by ordinary method including the steps of pressing under heating, taping, metallikon, voltage treatment, sealing of both end surfaces and attachment of lead wires. However, the method of producing the capacitor is not restricted thereto.

From the viewpoint of the long-term reliability of the capacitor, a capacitance changing ratio of the capacitor of the present invention which is allowed to stand for 1000 hours in an atmosphere of a temperature of 60° C. and a humidity of 95% RH applying a DC voltage of 60V/μm between the electrodes is −10 to 10%, preferably −5 to 5%. Also, a withstand voltage of the capacitor of the present invention is not less than 0.2 kV/μm, preferably not less than 0.4 kV/μm.

The metallized polyester film capacitor of the present invention has an excellent moist heat resistance, so that it is useful for the enhancement of the long-term reliability of capacitors. Thus, the present invention has a high industrial value.

EXAMPLES

The present invention will be explained in more detail hereinunder with reference to the following examples. It is to be understood, however, the present invention is not restricted to the following examples within the scope of the invention. The properties of the films and the capacitors in the examples and the comparative examples were evaluated by the following methods. "Part" in the examples and comparative examples means "part by weight".

(1) Analysis of alkali metal ions:

Li, Na, K, Rb, Cs and Fr contents were quantitatively analyzed by using an atomic absorption-photometer (Spectro AA, manufactured by Barlane Corp.) by a calibration curve method.

(2) Center line average roughness (Ra):

The center line average roughness was measured in the following way by using a surface roughness meter (SE-3F, manufacture by Kosaka Kenkyusho Co.). From the profile curve of a sample film, a portion of a reference length L (2.55 mm) was cut out in the direction of the center line. On the assumption that the center line of the cut-out portion was the axis X and the machine direction was the axis Y, the roughness curve was represented by y=f(x), the surface roughness (μm) was obtained from the following formula as the average surface roughness of the film.

$$Ra = 1/L \int_0^L |f(x)| dx$$

By determining 10 profile curves of the surface of the sample film and calculating by the average value of the center line average roughness of the cut-out portions obtained from these profile curves, the center line surface roughness was obtained. The radius of the tip of the stylus was 2 μm, the load was 30 mg, and the cut-off value was 0.8 mm.

(3) Contact angle between waterdrop and film:

The contact angle between a waterdrop of distilled water and a sample film was measured at a temperature of 23° C. and a humidity of 50% RH by using a contact angle gauge (Model CA-DT-A, manufactured by Kyowa Kaimenkagaku K.K.). The waterdrop contact angle was measured at left and right points in each of three sample films, and the average value of the six values in total was expressed as the waterdrop contact angle.

The diameter of a waterdrop was 2 mm and the value was read 1 minute after dropping the water.

(4) Adhesiveness:

A two-pack polyurethane adhesive of 100 parts of AD-502 and 10 parts of CAT-10 (produced by Toyo Mortone Co.) was applied to the surface of the vapor-deposited metal layer of a metallized film so that the dry weight was 5 g/m². On the coated adhesive film, a polyester film having the same thickness as the base polyester film was laminated by ordinary dry lamination method, and the resultant laminate was aged at a temperature of 40° C. for 48 hours. The thus-obtained laminate was cut into a slip of 15 mm in width and dipped in hot water of 50° to 55° C. (hot water treatment).

A part of the sample treated with hot water was peeled off and the sample film was subjected to T-peeling at a rate of 100 mm/min by a peel tester. The adhesiveness was evaluated in accordance with the following criteria.

o: 100 g < peeling load

Δ: 10 g < peeling load ≦ 100 g x: peeling load ≦ 10 g (5) Withstand voltage property:

The withstand voltage of a sample film was measured in accordance with JIS C-2319.

The voltage was raised at a rate of 100 V/sec in an atmosphere of a temperature of 23° C. and a humidity of 50% RH by using a 10-kV DC withstand voltage tester, and the voltage at the point of time when the film was broken and a short-circuit was caused was read.

(6) Change in capacitance:

(a) Unloaded withstand voltage test;

A capacitor was allowed to stand in an atmosphere of a temperature of 60° C. and a humidity of 95% RH for 1000 hours and the rate of change in the capacitance was obtained on the basis of the initial capacitance. The value obtained by subtracting the initial capacitance from the capacitance after 1000 hours was divided by the initial capacitance, and the quotient was expressed in a percentage.

(b) Loaded withstand voltage test;

A capacitor was allowed to stand in an atmosphere of a temperature of 60° C. and a humidity of 95% RH for 1000 hours applying a DC voltage of 60 V/μm between the electrodes, and the rate of change in the capacitance was obtained on the basis of the initial capacitance. The value obtained by subtracting the initial capacitance from the capacitance after 1000 hours was divided by the initial capacitance, and the quotient was expressed in a percentage.

Example 1

Polyethylene terephthalate containing 0.3 wt % of silica particles of an average particle diameter of 1.2 μm and having an intrinsic viscosity of 0.66 was melt-extruded at a temperature of 290° C. to produce an amorphous sheet, and then stretched at a temperature of 90° C. to 4.2 times in the machine direction. A coating solution composed of 90 parts (weight of the solid content, hereinunder "parts" in the coating solution refers to the same) of a water-dispersible polyurethane (Hydrane AP40 (trade name), produced by Dai-Nippon Ink & Chemicals, Inc) having ammonium carboxylate as a functional group, 10 parts of triethylene glycol diglycidyl ether and water as a medium was applied to both surfaces of the resultant film. The obtained film was stretched at a temperature of 110° C. to 3.9 times in the transverse direction and then heat-treated at a temperature of 230° C., thereby obtaining a biaxially stretched polyester film. The coating layer had a thickness of 0.04 μm and the base polyester film had a thickness of 5 μm. The alkali metals in the coating solution were 44 ppm of Na and 5.8 ppm of K (calculated as the solid content). The other metal content was below the minimum limit of detection. The waterdrop contact angle of the coating layer was 63°, and the average center line surface roughness (Ra) thereof was 0.020 μm.

Aluminum was vapor-deposited on the coating layer of the film to a thickness of 450 Å under a pressure of $10^{-4}$ Torr in the vacuum chamber of a resistance-heating metal vapor-depositing apparatus. Aluminum was vapor-deposited in stripes in the machine direction of the polyester film such that the vapor-deposited portions each having a width of 8 mm were arranged at intervals of 1 mm. The metallized polyester film was slit into tapes of 4.5 mm in width such that each tape had an unvapor-deposited portion of 0.5 mm in width at the left or right margin thereof.

Two sheets of metallized films having an unvapor-deposited portion at the left margin and the right margin, respectively, were stacked with one on top of the other so that the vapor-deposited portions protruded from each other's margin by 0.5 mm in the widthwise direction. These sheets were winded together. The winding was pressed at a temperature of 150° C. and a pressure of 50 kg/cm² for 5 minutes. After subjecting both end surfaces to metallikon, lead wires were attached to the winding, thereby obtaining a film capacitor having a capacitance of 0.1 μF.

The metallized film capacitor obtained in this manner had excellent withstand voltage and excellent moist heat resistance, and made only a slight change in the capacitance, as shown in Tables 1 and 2.

Comparative Example 1

A metallized polyester film capacitor was produced in the same way as in Example 1 except that the coating solution was not applied.

The capacitor was inferior in the moisture and heat resistance to the one in Example 1.

Comparative Example 2

A metallized polyester film capacitor was produced in the same way as in Example 1 except for the coating solution. The coating solution was obtained by adding sodium chloride to the coating solution in Example 1 so that Na content was 2000 ppm, K content was 5.8 ppm (calculated as the solid content), and the other metal content was below the minimum limit of detection.

The capacitor was inferior in the moist heat resistance to the capacitor in Example 1.

Example 2

A metallized polyester film capacitor was produced in the same way as in Example 1 except for the coating solution. The coating solution was obtained by adding sodium chloride to the coating solution in Example 1 so that Na content was 1000 ppm, K content was 5.8 ppm (calculated as the solid content), and the other metal content was below the minimum limit of detection.

Example 3

A metallized polyester film capacitor was produced in the same way as in Example 1 except for the coating solution.

The coating solution was obtained by adding sodium chloride to the coating solution in Example 1 so that Na content was 500 ppm, K content was 5.8 ppm (calculated as the solid content), and the other metal content was below the minimum limit of detection.

Example 4

A metallized polyester film capacitor was produced in the same way as in Example 1 except for the coating solution. The coating solution was obtained by adding sodium chloride to the coating solution in Example 1 so that Na content was 200 ppm, K content was 5.8 ppm (calculated as the solid content), and the other metal content was below the minimum limit of detection.

Comparative Example 3

A metallized polyester film capacitor was produced in the same way as in Example 1 except for the coating solution. The coating solution was composed of 100 parts of a water-dispersible polyester (Pluscoat RZ-124 (trade name), produced by Goo Chemical Industries Co., Ltd.) having sodium sulfonate as a functional group using water as a medium.

The alkali metals in the coating solution were 2900 ppm of Na and 15.6 ppm of K (calculated as the solid content). The other metal content was below the minimum limit of detection. The capacitor was inferior in the moist heat resistance to the capacitor in Example 1.

Example 5

A metallized polyester film capacitor was produced in the same way as in Example 1 except for the coating solution. The coating solution was obtained by passing the coating solution in Comparative Example 3 through a sulfonic acid-type ion-exchange resin column so that Na content was 25 ppm, K content was 1.6 ppm (calculated as the solid content), and the other metal content was below the minimum limit of detection.

The metallized film capacitor obtained in this manner had excellent withstand voltage and excellent moist heat resistance, and made only a slight change in the capacitance.

The results obtained from Examples 1 to 5 and Comparative Examples 1 to 3 are collectively shown in Tables 1 and 2.

TABLE 1

|  | Coating solution | | | Substrate film | | Vapor-deposited metal film Adhesive-ness |
|---|---|---|---|---|---|---|
|  | Alkali metal content (ppm) | | | Ra (μm) | Waterdrop contact angle |  |
|  | Na | K | Others |  |  |  |
| Ex. 1 | 44.0 | 5.8 | ≈0 | 0.020 | 63° | o |
| Comp. Ex. 1 | — | — | — | 0.020 | 66° | x |
| Comp. Ex. 2 | 2000 | 5.8 | ≈0 | 0.020 | 62° | Δ |
| Ex. 2 | 1000 | 5.8 | ≈0 | 0.020 | 63° | o |
| Ex. 3 | 500 | 5.8 | ≈0 | 0.020 | 63° | o |
| Ex. 4 | 200 | 5.8 | ≈0 | 0.020 | 63° | o |
| Comp. Ex. 3 | 2900 | 15.6 | ≈0 | 0.020 | 63° | o |
| Ex. 5 | 25.0 | 1.6 | ≈0 | 0.020 | 63° | o |

TABLE 2

|  | Properties of Capacitor | | |
|---|---|---|---|
|  | Withstand voltage (kV/μm) | Rate of change in capacitance Unloaded (%) | Rate of change in capacitance Loaded (%) |
| Ex. 1 | 0.56 | 0.5 | 0.5 |
| Comp. Ex. 1 | 0.55 | −12.0 | −42.5 |
| Comp. Ex. 2 | 0.56 | −6.6 | −20.9 |
| Ex. 2 | 0.56 | 0.5 | −5.5 |
| Ex. 3 | 0.56 | 0.5 | −2.0 |
| Ex. 4 | 0.56 | 0.5 | 0.5 |
| Comp. Ex. 3 | 0.56 | −5.5 | −22.2 |
| Ex. 5 | 0.56 | 0.5 | 0.7 |

Example 6

100 parts of dimethyl terephthalate, 70 parts of ethylene glycol and 0.11 part of calcium acetate hydrate were mixed and then heated to conduct ester exchange reaction, while raising the temperature and distilling off methanol. The reaction temperature was gradually raised to a temperature of 230° C. in about 4 hours after the start of the reaction, whereby the ester exchange reaction was substantially completed. Thereafter, 0.065 part of triethyl phosphite and 0.30 part of triethyl phosphate were added to the reaction mixture. Furthermore, 0.04 part of antimony trioxide was added to the reaction mixture to carry out polycondensation for 4 hours, thereby obtaining a polyester (A) having an intrinsic viscosity of 0.66.

A polyester (B) containing 1.0 wt % of calcium carbonate of an average particle diameter of 1.6 μm was obtained in the same way as the polyester (A) except for adding calcium carbonate of an average particle diameter of 1.6 μm.

90 parts of the polyester (A) and 10 parts of the polyester (B) were blended, and the mixture was melt-extruded at a temperature of 290° C. to produce an amorphous sheet, and then stretched at a temperature of 90° C. to 4.2 times in the machine direction. A coating solution which was composed of 90 parts (weight of the solid content, hereinunder "parts" in the coating solution refers to the same) of a water-dispersible polyurethane (Hydrane AP40 (trade name), produced by Dai-Nippon Ink & Chemicals, Inc) having ammonium carboxylate as a functional group, 10 parts of triethylene glycol diglycidyl ether, and water as a medium was applied to both surfaces of the resultant film. The obtained film was stretched at a temperature of 110° C. to 3.9 times in the transverse direction, and then heat-treated at a temperature of 230° C., thereby obtaining a biaxially stretched polyester film. The coating layer had a thickness of 0.04 μm and the base polyester film had a thickness of 5 μm. The waterdrop contact angle of the coating layer was 63°, and the average center line surface roughness (Ra) thereof was 0.020 μm.

Aluminum was vapor-deposited on the coating layer of the film to a thickness of 450 Å under a pressure of $10^{-4}$ Torr in the vacuum chamber of a resistance-heating metal vapor-depositing apparatus. Aluminum was vapor-deposited in stripes in the machine direction of the polyester film such that the vapor-deposited portions each having a width of 8 mm were arranged at intervals of 1 mm. The metallized polyester film was slit into tapes of 4.5 mm in width such that each tape had an unvapor-deposited portion of 0.5 mm in width at the left or right margin thereof. The metallized film obtained proved to have excellent adhesiveness as a result of evaluation.

Two sheets of metallized films having an unvapor-deposited portion at the left margin and the right margin, respectively, were stacked with one on top of the other so that the vapor-deposited portions protruded from each other's margin by 0.5 mm in the widthwise direction. These sheets were winded together. The winding was pressed at a temperature of a temperature of 150° C. and a pressure of 50 kg/cm² for 5 minutes. After subjecting both end surfaces to metallikon, lead wires were attached to the winding, thereby obtaining a film capacitor having a capacitance of 0.1 μF.

The metallized film capacitor obtained in this manner had excellent withstand voltage and excellent moist heat resistance, and made only a slight change in the capacitance, as shown in Table 3.

Comparative Example 4

A metallized polyester film capacitor was produced in the same way as in Example 6 except that no coating solution was applied to the film.

The capacitor was inferior in the moist heat resistance to the capacitor in Example 6.

Example 7

A metallized polyester film capacitor was produced in the same way as in Example 6 except for the coating solution. The coating solution was composed of 50 parts of a water-dispersible polyurethane (Hydrane AP40(trade name), produced by Dai-Nippon Ink & Chemicals, Inc) having ammonium carboxylate as a functional group, 50 parts of triethylene glycol diglycidyl ether, and water as a medium.

Example 8

A metallized polyester film capacitor was produced in the same way as in Example 6 except for the coating solution. The coating solution was composed of 100 parts of a water-dispersible polyester (Hydrane AP40 (trade name), produced by Dai-Nippon Ink & Chemicals, Inc) having ammonium carboxylate as a functional group, and water as a medium.

Example 9

A metallized polyester film capacitor was produced in the same way as in Example 6 except for the coating solution. The coating solution was composed of 90 parts of a water-dispersible polyurethane (Hydrane AP40 (trade name), produced by Dai-Nippon Ink & Chemicals, Inc) having ammonium carboxylate as a functional group, 10 parts of alkylolmelamine (Beckamine J101 (trade name), produced by Dai-Nippon ink & Chemicals, Inc), and water as a medium.

Example 10

A metallized polyester film capacitor was produced in the same way as in Example 6 except for the coating solution. The coating solution was composed of 80 parts of a water-dispersible polyester (Polyester WR961 (trade name), produced by Nippon Synthetic Chemical Industry Co., Ltd.) having ammonium carboxylate as a functional group, 20 parts of isocyanate blocked with carbamoyl sulfonate (Erastrone TO16 (trade name), produced by Dai-ichi Kogyo Seiyaku Co., Ltd.), and water as a medium.

Example 11

A metallized polyester film capacitor was produced in the same way as in Example 6 except for the coating solution. The coating solution was composed of 100 parts of a water-dispersible polyester (Polyester WR961 (trade name), produced by Nippon Synthetic Chemical industry Co., Ltd.), and water as a medium.

Example 12

90 parts of the polyester (A) and 10 parts of the polyester (B) were blended, and the mixture was melt-extruded at a temperature of 290° C. to produce an amorphous sheet. The sheet was stretched at a temperature of 90° C. to 4.2 times in the machine direction and then stretched at a temperature of 110° C. to 3.9 times in the transverse direction. Thereafter the sheet was heat-treated at a temperature of 230° C., thereby obtaining a biaxially stretched polyester film having a thickness of 5 μm. A solution of a mixture of 90 parts of a copolymer polyester (TP-236 (trade name), produced by Nippon Synthetic Chemical Industry Co., Ltd.) having a carboxyl group and 10 parts of polyisocyanate (Coronate L (trade name), produced by Nippon Polyurethane Industry Co., Ltd.) in a mixed solvent of methyl ethyl ketone and toluene was applied to the base polyester film so that the thickness of the coating layer was 0.1 μm after being dried.

A metallized polyester film capacitor was produced from the thus-obtained polyester film in the same way as in Example 6.

Example 13

Polyethylene terephthalate containing 0.1 part of silica having an average particle diameter of 0.1 μm was melt-extruded at a temperature of 290° C. to produce an amorphous sheet, and the sheet was stretched at a temperature of 90° C. to 4.2 times in the machine direction. A coating solution composed of 85 parts of a water-dispersible polyurethane (Hydrane AP40 (trade name), produced by Dai-Nippon Ink & Chemicals, Inc) having ammonium carboxylate as a functional group, 10 parts of triethylene glycol diglycidyl ether, 5 parts of silica sol having an average particle diameter of 0.06 μm, and water as a medium was applied to both surfaces of the resultant film.

A metallized polyester film capacitor was produced from the thus-obtained polyester film in the same way as in Example 6.

The results obtained from Examples 6 to 13 and Comparative Example 4 are collectively shown in Table 3.

TABLE 3

| | Substrate film | | Capacitor | | | | |
| --- | --- | --- | --- | --- | --- | --- | --- |
| | | | Vapor deposited metal film Adhesive-ness | Withstand voltage | Rate of change in capac-itance | Alkali metal content (ppm) | |
| | Ra (μm) | Water-drop | | (KV/μm) | (%) | Na | K |
| Ex. 6 | 0.020 | 63° | o | 0.56 | 0.5 | 44.0 | 5.8 |
| Comp. Ex. 4 | 0.020 | 66° | x | 0.55 | −12.0 | — | — |
| Ex. 7 | 0.020 | 61° | Δ | 0.55 | 0.9 | 42.2 | 7.7 |
| Ex. 8 | 0.020 | 63° | o | 0.56 | 1.2 | 44.4 | 5.3 |
| Ex. 9 | 0.020 | 62° | o | 0.54 | 0.7 | 43.8 | 310 |
| Ex. 10 | 0.020 | 64° | o | 0.55 | 0.5 | 112 | 14.5 |
| Ex. 11 | 0.020 | 61° | Δ | 0.54 | −9.0 | 72.8 | 9.6 |
| Ex. 12 | 0.025 | 62° | o | 0.60 | 0.6 | 2.5 | 1.2 |
| Ex. 13 | 0.020 | 63° | o | 0.54 | 0.6 | 44.0 | 5.8 |

What is claimed is:

1. A metallized polyester film capacitor composed of a metallized polyester film comprising:

a polyester film;

a coating layer composed of a water-soluble resin or a water-dispersible resin, formed on at least one side of said polyester film and having a center line average roughness (Ra) of 0.005 to 0.5 μm, wherein the alkali metal content of said coating layer is no more than 126.5 ppm, and wherein said water-soluble or water-dispersible resin is composed of urethane resins or polyesters;

a vapor-deposited metal on said coating layer.

2. A film capacitor according to claim 1, wherein said water-soluble or water-dispersible resin is a resin obtained by copolymerizing or grafting a skeleton resin with compounds having an anionic group, wherein said skeleton resin is composed of urethane resins or polyesters.

3. A film capacitor according to claim 2, wherein the counter ions of said anionic group are amine onium ions.

4. A film capacitor according to claim 2, wherein the amount of said anion group in said water-soluble or water-dispersible resin is 0.05 to 8 wt %.

5. A film capacitor according to claim 1, wherein said polyesters have a Tg of not more than 80° C..

6. A film capacitor according to claim 1, wherein said polyesters are ones having sulfonate groups.

7. A film capacitor according to claim 1, wherein said polyesters are acidic moiety contains 1 to 10 mol % of sulfo aromatic dicarboxylic acid unit or salts thereof.

8. A film capacitor according to claim 1, wherein said polyesters are acidic moiety contains 1 to 10 mol % of sulfo isophthalic acid unit or salts thereof.

9. A film capacitor according to claim 1, wherein said urethane resins are ones having carboxylic acid groups or salts thereof as hydrophilic groups.

10. A film capacitor according to claim 1, wherein said urethane resins are ones whose polyol moiety contains not less than 50 mol % of polyesterpolyol unit.

11. A film capacitor according to claim 1, wherein said urethane resins are ones whose isocyanate moiety contains not less than 50 mol % of at least one selected from the group consisting of an aromatic diisocyanate unit and an isophorone diisocyanate unit.

12. A film capacitor according to claim 1, wherein said coating layer has a thickness of 0.01 to 3 μm.

13. A metallized polyester film capacitor according to claim 1, wherein the alkali metal content of the coating layer is not more than 49.9 ppm.

14. A film capacitor according to claim 1, wherein said coating layer is composed of (a) at least one resin having a carboxyl group, a hydroxyl group or salts thereof, wherein said resin is composed of urethane resins or polyesters, and (b) at least one crosslinking agent selected from the group consisting of isocyanate compounds, epoxy compounds and amine compounds.

15. A film capacitor according to claim 14, wherein said resin having a carboxyl group, a hydroxyl group or salts thereof is one obtained by copolymerizing or grafting a skeleton resin with compounds having an anionic group wherein said skeleton resin is composed of urethane resins or polyesters.

16. A film capacitor according to claim 15, wherein the counter ions of said anionic group are amine onium ions.

17. A film capacitor according to claim 15, wherein the amount of said anion group is 0.05 to 8 wt %.

18. A film capacitor according to claim 14, wherein said isocyanate compound is one selected from the group consisting of 2,4-toluene diisocyanate, 2,6-toluene diisocyanate, xylylene diisocyanate, xylylene diisocyanate hydride, diphenylmethane-4,4-diisocyanate, diphenylmethane-4,4'-diisocyanate hydride, paraphenylene diisocyanate, 1-chloro-2,4-phenyl diisocyanate, 1-chloro-1,4-phenyl diisocyanate, 1,5-naphthalen diisocyanate, 4,4'-biphenylene diisocyanate, hexamethylene diisocyanate, 1,4 -tetramethylene diisocyanate, isophorone diisocyanate, trimer of isophorone diisocyanate, triphenylmethane triisocyanate, methylenebis(4-phenylmethane)triisocyanate, trimethylolpropane of these isocyanate compounds, triethylene glycol additives of these isocyanate compounds, ketoxime block materials of these isocyanate compounds, and phenol block materials of these isocyanate compounds.

19. A film capacitor according to claim 14, wherein said epoxy compound is one selected from the group consisting of diglycidyl ether of bisphenol A and origomers thereof, diglycidyl ether of bisphenol A hydrate and origomers thereof, diglycidyl orthophthalate, diglycidyl isophthalate, diglycidyl terephthalate, diglycidyl p-oxybenzoate ether, diglycidyl tetrahydrophthalate, diglycidyl hexahydrophthalate, diglycidyl succinate, diglycidyl sebacate, diglycidyl adipate, ethylene glycol diglycidyl ether, propylene glycol diglycidyil ether, 1,4-butandiol diglycidyl ether, 1,6-hexanediol diglycidyl ether, polyalkylene glycol diglycidyl ether, triglycidyl trimellitate, triglycidyl isocyanurate, 1,4-diglycidyloxybenzene, diglycidilethyleneurea, diglycidilpropyleneurea, glycerin diglycidyl ether, glycerin triglycidyl ether, glycerin polyglycidyl ether, trimethylolethane polyglycidyl ether, trimethylolpropane triglycidyl ether, trimethylolpropane polyglycidyl ether, pentaerythritolpolyglycidyl ether, and polyglycidyl ether, diglycidyl aniline and diglycidyl amine of glycerol alkyleneoxide additives.

20. A film capacitor according to claim 14, wherein said amine compound is one selected from the group consisting of melamine, urea, benzoguanamine, amino resins obtained by the addition condensation of said amino compounds with formaldehyde or an alcohol having 1 to 6 carbon atoms, hexamethylenediamine, and triethanolamine.

21. A film capacitor according to claim 14, wherein said coating layer further contains a lubricant.

22. A film capacitor according to claim 21, wherein said lubricant is one selected from the group consisting of silica, silica sol, alumina, alumina sol, zirconium sol, kaolin, talc, calcium carbonate, calcium phosphate, titanium oxide, barium sulfate, carbon black, molybdenum sulfide, antimony oxide sol, polystyrene, polyethylene, polyamide, polyester, polyacrylate, epoxy resin, silicone resin and fluorine resin.

23. A film capacitor according to claim 14, wherein the amount of said crosslinking agent is 1 to 40 wt %.

24. A film capacitor according to claim 14, wherein said polyesters have a Tg of not more than 80° C.

25. A film capacitor according to claim 14, wherein said polyesters are ones having sulfonate groups.

26. A film capacitor according to claim 14, wherein said polyesters are ones whose acidic moiety contains 1 to 10 mol % of sulfo aromatic dicarboxylic acid unit or salts thereof.

27. A film capacitor according to claim 14, wherein said polyesters are ones whose acidic moiety contains 1 to 10 mol % of sulfo isophthalic acid unit or salts thereof.

28. A film capacitor according to claim 14, wherein said urethane resins are ones having carboxylic acid groups or salts thereof as hydrophilic groups.

29. A film capacitor according to claim 14, wherein said urethane resins are ones wherein a polyol moiety thereof contains not less than 50 mol % of polyesterpolyol unit.

30. A film capacitor according to claim 14, wherein said urethane resins are ones wherein a isocyanate moiety thereof contains not less than 50 mol % of at least one selected from the group consisting of an aromatic diisocyanate unit and an isophorone diisocyanate unit.

31. A metallized polyester film capacitor comprising:

(A) a metallized polyester film composed of a polyester film, coating layers formed on both sides of the polyester film, and a metal vapor-deposited on each of the coating layers, wherein the alkali metal content of the coating layers is not more than 126.5 ppm and wherein the coating layers are composed of urethane resins or polyesters; and (B) (i) a polyester film or (ii) a coated polyester film, wherein the coated polyester film has a coating layer on at least one side of said film in which the alkali metal content of the coating layer is not more than 126.5 ppm and wherein the coating layer is composed of urethane resins or polyesters.

32. A metallized polyester film capacitor according to claim 31, wherein the alkali metal content of the coating layers in metallized polyester film (A) and the coating layer in coated polyester film (B)(ii) is not more than 49.9 ppm.

33. A metallized polyester film capacitor comprising:

(A) a metallized polyester film composed of a polyester film, coating layers formed on both sides of the polyester film, and a metal vapor-deposited on each of the coating layers, wherein the alkali metal content of the coating layers is not more than 126.5 ppm and the center line average roughness (Ra) of the surface of the coating layers is 0.005 to 0.5 μm, and wherein the coating layers are composed of (a) at least one resin having a carboxyl group, a hydroxyl group or salts thereof, with said resin being composed of urethane resins or polyesters, and (b) at least one crosslinking agent selected from the group consisting of an isocyanate compound, an epoxy compound and an amine compound; and (B) (i) a polyester film or (ii) a coated polyester film, wherein the coated polyester film has a coating layer on at least one side of said film in which the alkali metal content of the coating layer is not more than 126.5 ppm and wherein the coating layer is composed of (a) at least one resin having a carboxyl group, a hydroxyl group or salts thereof, with said resin being composed of urethane resins or polyesters, and (b) at least one crosslinking agent selected from the group consisting of an isocyanate compound, an epoxy compound and an amine compound.

34. A metallized polyester film capacitor according to claim 33, wherein the alkali metal content of the coating layers in metallized polyester film (A) and the coating layer in coated polyester film (B)(ii) is not more than 49.9 ppm.

35. A metallized polyester film capacitor produced by winding or stacking a metallized polyester film comprising a polyester film, a coating layer formed on at least one side of the polyester film, and a metal vapor-deposited on the coating layer, wherein the alkali metal content of the coating layer is not more than 126.5 ppm and the center line average roughness (Ra) of the surface of the coating layer is 0.005 to 0.5 μm, and wherein the coating layer is composed of (a) at least one resin having a carboxyl group, a hydroxyl group or salts thereof, with said resin being composed of urethane resins or polyesters, and (b) at least one crosslinking agent selected from the group consisting of an isocyanate compound, an epoxy compound and an amine compound.

* * * * *